Figure 1:
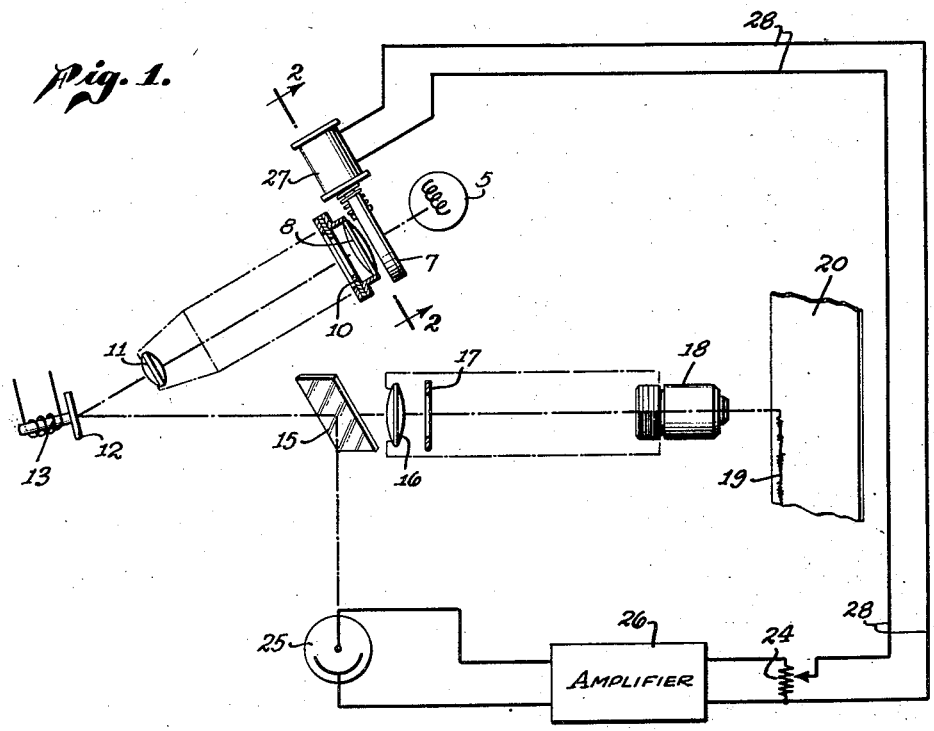

Feb. 24, 1942.  M. E. COLLINS  2,274,530

AUTOMATIC LIGHT INTENSITY CONTROL FOR SOUND APPARATUS

Filed Aug. 24, 1940

Inventor

MILFORD E. COLLINS,

By

Attorney

Patented Feb. 24, 1942

2,274,530

UNITED STATES PATENT OFFICE 2,274,530

AUTOMATIC LIGHT INTENSITY CONTROL FOR SOUND APPARATUS

Milford Edwin Collins, Los Angeles, Calif., assignor to Radio Corporation of America, a corporation of Delaware Application August 24, 1940, Serial No. 354,017

10 Claims. (Cl. 179—100.3)

This invention relates to sound recording and reproducing apparatus and particularly to an improvement in this apparatus whereby a constant light intensity during the recording of a sound record or the reproduction thereof is maintained.

In the reproduction of photographic sound records, a light source of constant intensity is employed for supplying light for projection upon the sound track of a photographic sound record, the emergent light being impressed upon a photoelectric cell or other light sensitive device. Since the reproduced sound is directly related to the variations in light impinging upon the cell, it is readily understood that any variations in the intensity of the light as projected on the film will appear in the reproduced sound either in the form of distortion or as variations in the average level of reproduction. Although certain sound recording systems employ light sources in which the intensity of the light therefrom is directly varied in accordance with the sound waves to be recorded, the usual and conventional systems employ a light source of constant intensity which is modulated either by varying the width of a light slit or by shifting a constant intensity light beam by galvanometer mirrors. In the constant intensity light source recording systems, therefore, it is necessary that the light intensity remain constant during recording or otherwise the light source variations will be recorded and will appear in the reproduced sound in the same manner as a varying intensity light in the reproducing system.

Former practice in maintaining the intensity of a light source constant has been to check the light intensity from time to time by noting the current to the lamp or by reflecting the light to a photoelectric cell and measuring the light intensity. This, of course, can be done only before and after a recording sequence, and should the light vary during the sequence, the take may be spoiled to an extent to require a rerecording thereof. This, of course, is expensive and consumes time.

The present invention is directed to a method of obtaining uniform film exposure by employing means for automatically maintaining the intensity of the light as impressed upon the film at a constant value at all times. The system functions as well during the recording and reproduction as before and after, and thus the light beam intensity as impressed upon the film remains substantially constant. The invention provides a constant average sound level previously determined and, of course, prevents the introduction of distortion produced by light variations at the source.

The principal object of the invention, therefore, is to facilitate the recording and reproduction of photographic sound records.

Another object of the invention is to maintain the intensity of a beam of light impinging upon a film at a constant value at all times.

A further object of the invention is to automatically control the intensity of a light source and maintain it at a constant value.

A further object of the invention is to automatically utilize a portion of the light of a sound recording or reproducing system for automatically maintaining another portion of the light at a constant value.

Figure 2:
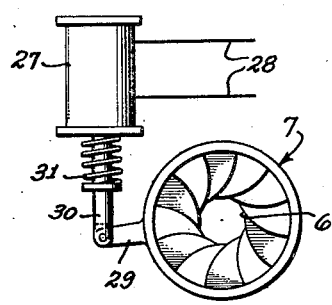

Although the novel features which are believed to be characteristic of this invention will be pointed out with particularity in the appended claims, the manner of its organization and the mode of its operation will be better understood by referring to the following description read in conjunction with the accompanying drawing forming a part thereof in which Figure 1 is a diagrammatic arrangement of a sound recording system embodying the invention; and Figure 2 is a detailed view of the light controlling element of the system taken along the line 2—2 of Fig. 1.

Referring now to the figures, light from a light source 5 passes through an aperture 6 (see Fig. 2) of a variable iris 7 to a collecting lens 8. The light passing through the lens 8 is then projected through the aperture in a plate 10 and through a lens 11 to the mirror 12 of a galvanometer diagrammatically represented by an actuating coil 13. The light from the mirror 12 is then reflected to a mirror 15 which reflects a portion of the light and transmits another portion, as will be explained hereinafter. The transmitted light from the mirror 15 impinges upon a lens 16 and then onto a slit mask 17, the light emerging through the slit being projected by projecting lens unit 18 to the sound track portion 19 of a film 20. This fundamental recording system is disclosed in detail in U. S. Patents 2,102,776, 2,102,- 777 and 2,102,778.

The light reflected by the mirror 15 impinges upon a photoelectric cell 25 connected to an amplifier 26. The output of the amplifier 26 is impressed over a potentiometer 24 and conductors 28 upon a solenoid 27. The value of the energy supplied to the solenoid 27 determines the size of opening 6 in the iris 7 since the control arm 29 is connected to the armature 30 of the solenoid. Reaction to the pull of the armature is effected by a compression spring 31.

Referring now to the mirror 15, this mirror may be of the partially silvered type disclosed in copending application Serial No. 306,953, filed November 30, 1939, the thickness of the coating determining the percentage of the light reflected to the cell. The type of mirror preferred, however, is that disclosed in copending application Serial No. 332,670, filed May 1, 1940, known as a "dichroic" reflector which transmits to the film all the light useful in recording, such as violet and ultra-violet, and reflects the remainder to the photocell 25, to which the cell may be particularly sensitive. In this manner there is substantially no loss of recording light caused by the insertion of the filter 15 and, consequently, by the use of the automatic light intensity control.

In setting up the system, the first step is to determine the proper iris opening 6 for an optimum light intensity to provide the proper film exposure. The opening is adjusted by varying the flow of current between amplifier 26 and solenoid 27 by the potentiometer 24 or similar means. Now should the light from the source 5 decrease in intensity, the input to amplifier 26 and to the solenoid 27 will decrease and the action of the bias spring 31 will open the iris 7 to permit more light to be projected on the mirror 12 and, consequently, on the film 20. Should the light intensity increase, then the output of the photoelectric cell 25 increases, the pull of solenoid 27 is greater, and the iris 7 will close until an equilibrium current is reached. Thus, after a certain current value and the proper opening of the iris 7 has been determined, the system will then automatically maintain this light intensity within predetermined operating limits.

By the use of such a spectrum splitting reflector 15, as above described, it is unnecessary to increase the size of the normal light source since the automatic control portion of the system is operated by light which ordinarily is not used in the recording process.

Although the above system has been described in conjunction with a sound recording system, it is to be understood that it is also applicable to sound reproducing systems wherein light from the light source is projected directly onto the film as a fixed narrow beam of constant intensity.

It is also to be understood that although the light intensity has been shown as being controlled by a varying aperture between the light source and the film, the output of the amplifier 26 may also be applied directly to the energy source supplying the light source to maintain the light intensity thereof at a certain predetermined constant value.

What I claim as my invention is:

1. Sound apparatus comprising a light source, means for forming said light into a beam, means for intercepting a certain frequency portion of said beam, and means for utilizing said selected frequency portion of said beam to maintain the total light of said beam at a constant intensity.

2. Sound apparatus in accordance with claim 1 in which said last-mentioned means includes a variable shutter under control of the variations in the intensity of said selected frequency portion of said light beam.

3. In a sound recording system the combination of a light source, means for selecting a certain spectral portion of the light from said source, means for projecting said certain spectral portion of the light from said source to a motion picture film, means for intercepting a different spectral portion of said light, and means for utilizing said second spectral portion for varying said first-mentioned spectral portion.

4. In a sound recording system the combination of a light source, means for selecting a certain portion of the light from said source, means for projecting said certain portion of the light from said source to a motion picture film, means for intercepting a second portion of said selected portion of said light, and means for utilizing said intercepted portion for varying the amount of the first portion selected, said first-mentioned selecting means including a variable shutter, and said intercepting means including a dichroic reflector.

5. The method of maintaining a light source at a constant intensity comprising dividing the light from said source into portions of different frequencies, and controlling the intensity of one of said portions by the variations in intensity of said other portion.

6. The method of maintaining a light source at a constant intensity comprising selecting a predetermined amount of light from said source, intercepting a portion of said first selected amount of light, and controlling the amount of light selected by the variations in intensity of said intercepted portion, said intercepted portion being a portion of the frequency spectrum of said light.

7. In a light control system, a light source, means for selecting a certain portion of light from said light source, means for defining said selected portion into a beam adapted to be varied, and means for selecting a certain spectral portion of the varied light beam for controlling the amount of light selected from said light source.

8. In a light control system, a light source, means for selecting a certain portion of light from said light source, means for defining said selected portion into a beam adapted to be varied, and means for selecting a certain spectral portion of the varied light beam for controlling the amount of light selected from said light source, said second selecting means being adapted to reflect a certain portion of the frequency spectrum of said light source and to transmit another portion thereof.

9. A system for maintaining a light beam at a predetermined intensity comprising a light source, means for forming the light from said source into a definite shaped beam, means for projecting said beam to a light sensitive medium, means for intercepting a certain frequency portion of the beam during projection of said beam to said medium, said one portion being impressed on said medium, and means for utilizing variations in the intensity of another frequency portion of said beam to effectively maintain said light source at said predetermined intensity.

10. A system for maintaining a light beam at a predetermined intensity comprising a light source, means for forming the light from said source into a definite shaped beam, means for projecting said beam to a light sensitive medium, means for intercepting a portion of the beam during projection of said beam to said medium, and means for utilizing variations in the intensity of the intercepted portion of said beam to effectively maintain said light source at said predetermined intensity, said intercepting means selecting certain frequencies of the light spectrum from said source, and said last-mentioned means including a photoelectric cell adapted to be actuated by variations in intensity of said selected frequencies, and means connected to the output of said cell for varying the light adapted to be formed into said beam.

MILFORD EDWIN COLLINS.